US010128571B2

(12) United States Patent
Sazegar et al.

(10) Patent No.: US 10,128,571 B2
(45) Date of Patent: Nov. 13, 2018

(54) COUNTER ELECTRODE DEVICE, SYSTEM AND METHOD FOR VARYING THE PERMITTIVITY OF A LIQUID CRYSTAL DEVICE

(71) Applicants: Mohsen Sazegar, Kirkland, WA (US); David Cure, Redmond, WA (US); Ryan Stevenson, Woodinville, WA (US)

(72) Inventors: Mohsen Sazegar, Kirkland, WA (US); David Cure, Redmond, WA (US); Ryan Stevenson, Woodinville, WA (US)

(73) Assignee: KYMETA CORPORATION, Redmond, WA (US)

( * ) Notice: Subject to any disclaimer, the term of this patent is extended or adjusted under 35 U.S.C. 154(b) by 200 days.

(21) Appl. No.: 15/042,938

(22) Filed: Feb. 12, 2016

(65) Prior Publication Data
US 2016/0241217 A1 Aug. 18, 2016

Related U.S. Application Data

(60) Provisional application No. 62/116,255, filed on Feb. 13, 2015.

(51) Int. Cl.
*H01Q 3/44* (2006.01)
*H01P 7/08* (2006.01)
(Continued)

(52) U.S. Cl.
CPC ........... *H01Q 3/44* (2013.01); *G02F 1/13306* (2013.01); *H01P 7/088* (2013.01); *H01Q 9/045* (2013.01);
(Continued)

(58) Field of Classification Search
CPC .......... H01Q 3/44; H01Q 9/045; H01Q 1/243; H01Q 1/2266; G02F 1/3306;
(Continued)

(56) References Cited

U.S. PATENT DOCUMENTS

| 2001/0038372 A1* | 11/2001 | Lee | ....................... G09G 3/2011 345/89 |
| 2014/0098316 A1* | 4/2014 | You | ....................... G02F 1/1334 349/42 |
| 2014/0240342 A1* | 8/2014 | Xu | ........................... G09G 3/36 345/590 |

* cited by examiner

*Primary Examiner* — Rakesh Patel
*Assistant Examiner* — Jorge Salazar, Jr.
(74) *Attorney, Agent, or Firm* — Womble Bond Dickinson (US) LLP

(57) ABSTRACT

Techniques and mechanisms for changing a permittivity of a liquid crystal (LC) cell that is to facilitate a radiating or guiding of a radio frequency electromagnetic wave. In an embodiment, a device includes electrodes coupled to variously apply different electrical fields to the LC cell at different times. At one time, a first electrical field is applied to increase an average alignment of polar LC molecules with a first axis. At another time, a second electrical field is applied to decrease the average alignment of such polar LC molecules with the first axis. The first electrical field and the second electrical field have different respective directions at a first location of the LC cell. In another embodiment, the first electrical field is applied with a first plurality of electrodes and the second electrical field is applied with a second plurality of electrodes that is different than the first plurality of electrodes.

16 Claims, 13 Drawing Sheets

(51) Int. Cl.
  *G02F 1/133*  (2006.01)
  *H01Q 9/04*  (2006.01)
  *G02F 1/13*  (2006.01)
  *H01Q 1/22*  (2006.01)
  *H01Q 1/24*  (2006.01)

(52) U.S. Cl.
  CPC ......... *G02F 1/1313* (2013.01); *H01Q 1/2266* (2013.01); *H01Q 1/243* (2013.01)

(58) Field of Classification Search
  CPC ...... G02F 1/13306; G02F 1/1313; G02F 1/13; H01P 7/00; H01P 7/08; H01P 7/088
  USPC ................................ 333/161, 219, 221, 235
  See application file for complete search history.

COUNTER ELECTRODE DEVICE, SYSTEM AND METHOD FOR VARYING THE PERMITTIVITY OF A LIQUID CRYSTAL DEVICE

CROSS-REFERENCE TO RELATED APPLICATIONS

This application claims the benefit of a U.S. Provisional Application No. 62/116,255 filed on Feb. 13, 2015, the entire contents of which are hereby incorporated by reference herein.

BACKGROUND

1. Technical Field

Embodiments discussed herein relate generally to integrated electronic capacitive devices and more particularly, but not exclusively, to a tunable liquid crystal device for radio frequency communication.

2. Background Art

Nematic liquid crystals (LCs) have been used as a dielectric material for tunable devices. These materials feature an anisotropic dielectric constant. Applying an electrostatic field across the LC material changes the orientation of the LC molecules, which results in a change of the anisotropic dielectric constant. This functionality is used to realize tunable components such as tunable capacitors, tunable antenna elements and tunable phase shifters.

Variable delay line devices are one example of integrated electronic hardware that has, over the past few years, incorporated nematic liquid crystal as a tunable radio frequency (RF) material. During operation of such a device, an electrical field can be applied to induce an at least partial alignment of polar LC molecules. This alignment results in a change to the permittivity of the LC material, which in turn results in different delay line (or other) characteristics of the device.

As successive generations of integrated electronic devices continue to scale in size and speed, the performance requirements for various applications of such devices continue to become more stringent. As a result, there is expected to be an increasing demand to have tunable electronic mechanisms work in and/or with such faster, smaller or otherwise more efficient next generation integrated electronic devices. However, the industry is beginning to reach limits of existing technologies for operating such tunable resonator devices. For example, in LCD technology, fast switching is obtained mainly by reducing the LC gap size to a few micrometers. However, this option is not available when trying to meet the RF requirements in most applications.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1A:
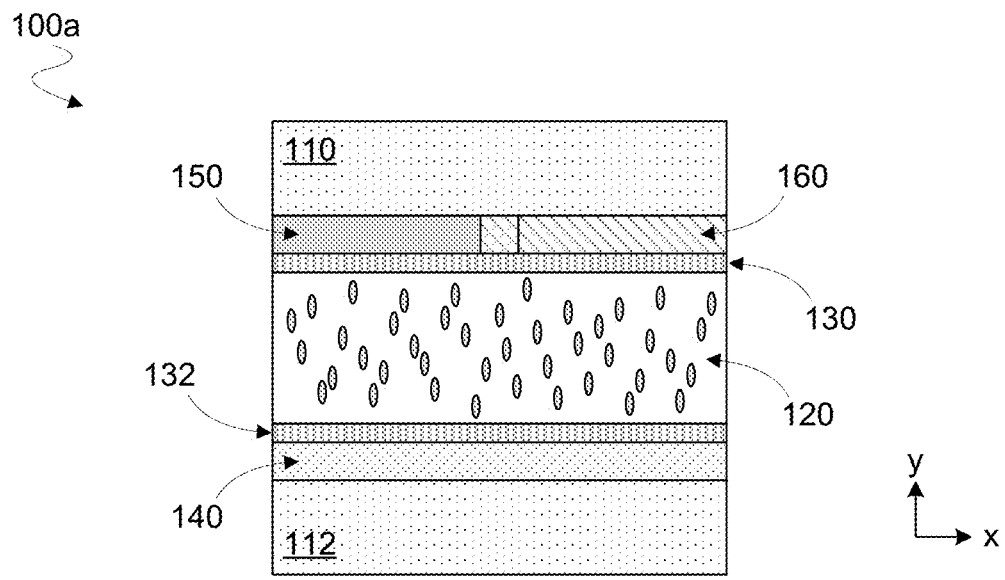
FIGS. 1A, 1B are cross-sectional diagrams each of a tunable liquid crystal device according to an embodiment.

Embodiments discussed herein variously provide techniques and/or mechanisms for improved operating characteristics—e.g., including decay time and/or control thereof—of a liquid crystal (LC) cell in any of a variety of tunable devices. Examples of such tunable RF devices include, but are not limited to, any of various microstrip-based or stripline-based devices having an LC cell (also referred to herein as an LC channel) sandwiched between two electrodes of a plurality of electrodes that are controlled to variously apply different electrical fields to the LC cell at different times. Such electrical fields may include a first electrical field having a first direction and a second electrical field having a second direction other than (e.g., oblique to, perpendicular to or opposite) the first direction.

Certain features of various embodiments are described herein with reference to a tunable radio frequency (RF) device—e.g., one of various tunable antennas and/or tunable resonators. However, such discussion may be extended to additionally or alternatively apply to any of a variety of other types of devices including a variable (e.g., tunable) liquid crystal cell. For example, such devices may include, but are not limited to, any of various capacitors, antennas, phase shifters, delay lines, filters, resonators and/or other devices including liquid crystal, the permittivity of which may be varied.

Although certain embodiments are not limited in this regard, the LC may be disposed in a membrane comprising a low dielectric constant, low loss tangent material, such as expanded polytetrafluoroethylene (PTFE) or expanded UHMWPE (ultra high molecular weight polyethylene). Alternatively, the membrane may comprise microfibers and/or nanofibers—e.g., including stranded materials comprising nylon, polyester, polypropylene, and/or the like to be used as an intermediary material. The membrane material may provide stability to the LC matrix of a large cell gap RF device—e.g., where the LC matrix might otherwise by characterized by multiple domains and grain boundaries between such domains. This stability may result from the membrane supporting efficient ordering of a nematic LC state that, for example, results in lower RF losses and faster relaxation speed.

A tunable RF device according to an embodiment may operate to support millimeter, microwave or other signal transmission and/or reception applications—e.g., wherein a liquid crystal cell gap of the RF devices is as small as a few (e.g., about 2.5 to 4.5) microns. In one embodiment, a surface scattering antenna includes resonant antenna structures evanescently coupled to microstrip guided wave structures including an interstitial material between a microstrip metal and a metal plane that are controlled by voltage control logic to provide different (e.g., opposite) electrical field polarities across the liquid crystal cell gap at different times. In another embodiment, a surface scattering antenna device according to an embodiment may include resonant antenna elements evanescently coupled to stripline structures, where an interstitial material is placed above and below a stripline metal. The resonant antenna elements and the stripline metal may be controlled by voltage control logic to provide different electrical field polarities across an LC cell of the interstitial material at different times. A tunable device may support operation in any of a variety of regions of the RF (and/or other) spectrum—e.g., including some or all of a microwave range, some or all of a millimeter range, etc.

A tunable resonator device to be controlled according to an embodiment may provide for biasing of the LC cell to facilitate an ability to tune the RF device in one or more respects. For example, the RF device may include a surface scattering antenna including one or more resonant antenna elements. At each such resonant antenna element, an amplitude of radiated energy may be selectively tuned by adjusting a respective electrical field applied to a corresponding liquid crystal cell portion. Such tuning may change a capacitance of an antenna element, which shifts a resonant frequency of that antenna element. Although certain embodiments are not limited in this regard, a surface scattering antenna may support beam forming, for example, by implementing a phase hologram wherein respective resonances of different antenna elements are tuned—e.g., for a 180 degree phase change between adjacent elements. In another embodiment, a delay line with tunable phases may be implemented.

In previous designs of tunable resonator devices, an LC cell of a resonator device tuned to an ON (polarized) state with an electrical field of a particular direction, where the strength of the electrical field—with that same direction—is later reduced (e.g., to zero) to allow the LC cell to passively return to a comparatively less polarized OFF state. By contrast, voltage control techniques according to various embodiments apply an electrical field of a different (e.g., substantially perpendicular) direction to actively drive an LC cell toward a less polarized state, such as an OFF state.

As shown by the equations herein, a thickness d of the LC layer has a pronounced second order effect on the response time. Thus, reducing the cell gap will promote fast restoration of the LC. Unfortunately, in a microstrip antenna (for example), as the thickness decreases the radiated power also tends to decrease. To limit the effects of this tendency, certain embodiments provide for relatively increased switching speeds of an LC tunable resonator (e.g., a microstrip antenna) for a given set of LC layer thickness and material properties.

Performance parameters that are desired in LC RF devices typically include high tunability, low RF losses and high switching speed. Improving the switching speed of the material usually comes at the cost of lower tunability and/or higher losses. Recent developments in LC tunable resonator technology have sought to develop or otherwise identify new materials with relatively low viscosity and/or relatively high elastic constants. Unfortunately, such materials typically further exhibit relatively low birefringence. A low birefringence will reduce the tunability of the radiator material, resulting in the overall antenna performance being poor—e.g., due to lower antenna gain and/or smaller bandwidth. Moreover, an increased elastic constant tends to require larger voltages to turn on the LC cell in question. Another approach that is used in current LCD technologies is to achieve reduction in the LC cell thickness (gap). However, the reduction of gap leads to lower antenna radiation efficiency and lower overall performance. By contrast, embodiments discussed herein variously achieve increases in switching response that are independent of material properties and/or gap size of an LC layer.

For example, certain embodiments apply a high electric field to different microstrip radiators configurations. The bias lines are placed in areas where the electric field at RF frequencies is weak and will not affect the antenna performance. However at DC or very low frequencies the voltage applied will drive the orientation of the LC molecules toward the OFF state faster than passive relaxation, and thus increase the switching speed on the OFF state.

One feature provided by various embodiments is that electrode elements are used to establish an electrostatic tuning field with relatively more perpendicular (e.g., horizontal) field components in order to actively drive LC molecules from being relatively aligned across a thickness of the LC cell toward being relatively aligned along the thickness of that LC cell. By doing so, the LC molecules will more quickly be reoriented along the horizontal field, since they do not rely exclusively on structural relaxation mechanism. This increases the switching speed dramatically.

Figure 1B:
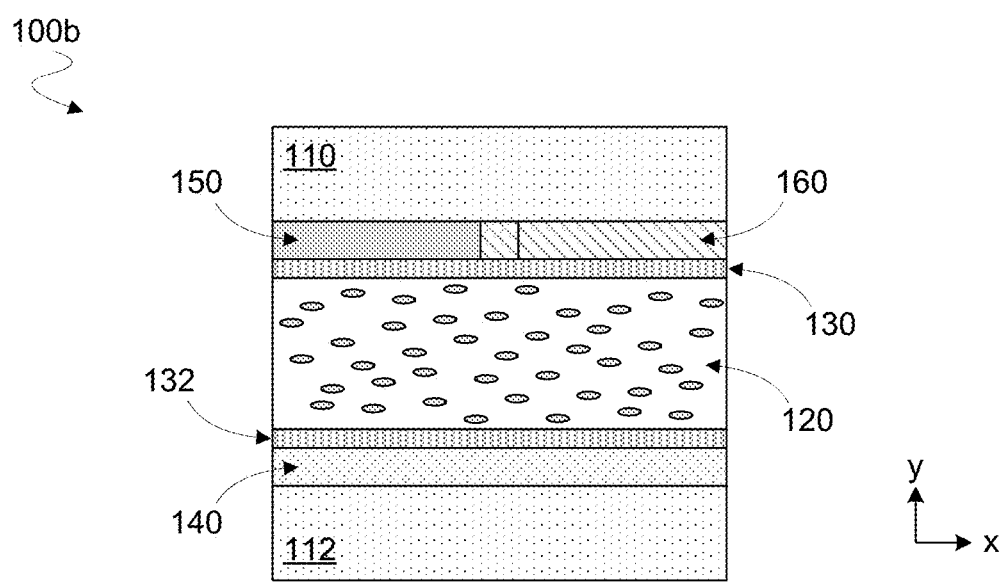

FIGS. 1A, 1B variously show respective states 100a, 100b of a device that includes a liquid crystal cell (for brevity, referred to herein as a "liquid crystal device") according to an embodiment. The liquid crystal device shown in FIGS. 1A, 1B is one example of an embodiment that may be or include a mechanism (referred to herein as a "communication unit") comprising a liquid crystal cell and electrodes that are to radiate or guide a RF electromagnetic wave. As used herein, "radio frequency" or "RF" refers to any frequency in range between 300 kiloHertz (kHz) and 300 gigaHertz (GHz). The communication unit may be tuned or otherwise adjusted to provide any of various different levels of permittivity of the liquid crystal cell. In one illustrative embodiment, the LC device shown in FIGS. 1A, 1B provides functionality of a tunable patch antenna.

As shown in FIG. 1A, the liquid crystal device may include an LC cell 120 formed in a gap between two substrates 110, 112. Alignment layers 130, 132 may be also disposed in such a gap, on opposite sides of LC cell 120, to facilitate alignment of LC molecules in LC cell 120. One of each of substrates 110, 112 may comprise a glass material—e.g., an FR-4 glass epoxy—and/or any of various other insulating materials adapted from conventional devices for adjusting permittivity of a liquid crystal cell. Alternatively or in addition, one or each of alignment layers 130, 132 may include polyimide and/or any of various other materials adapted from conventional LC alignment mechanisms.

LC molecules of LC cell 120 may be oriented (e.g., reoriented) at a given time based on the application of an electrical field. At another time, a second electrical field may be applied with a second plurality of electrodes that, for example, is different than the first plurality of electrodes. One or more electrodes may belong to both the first plurality of electrodes and the second plurality of electrodes, although some embodiments are not limited in this regard.

In the illustrative embodiment shown in FIG. 1A, the LC device includes at least three electrodes—as represented by the illustrative electrodes 140, 150, 160—to variously drive the application of different electrical fields at different times. An insulation material may be disposed between electrodes 150, 160 to facilitate the creation of a voltage difference between electrodes 150, 160. Any of a variety of additional or alternative number and/or combination of three or more electrodes may be provided, according to different embodiments, to facilitate the application of different electrical fields to LC cell 120.

State 100a (e.g., which is to serve functionally as a relatively tuned state, or an "ON" state) may result from one or more voltage sources—not shown—generating a voltage difference between electrode 140 and, for example, one or both of electrodes 150, 160. Such a voltage difference may form in LC cell 120 a first electrical field that is substantially directed along the y-axis shown. The first electrical field may (re)orient polar LC molecules of LC cell 120 to increase their respective alignments with the y-axis.

Alternatively or in addition, state 100b (shown in FIG. 1B) (which may serve functionally as an "OFF" state or a relatively untuned state) may result from one or more voltage sources generating another voltage difference—e.g., between electrodes 150, 160. A second electrical field may thus be formed—e.g., where, in the LC cell 120, the second electrical field, as compared to the first electrical field, is more oriented along the x-axis shown. The second electrical field may reorient polar LC molecules of LC cell 120 to increase their respective alignments with the x-axis (and decrease their respective alignments with the y-axis). In state 100b, LC molecules of LC cell 120 are, on average, more horizontally aligned, along the x-axis shown, due in part to the second electrical field and the presence of alignment layers 130, 132 on the top and bottom of LC cell 120.

By applying an electrostatic field between electrodes on opposite sides of LC cell 120, LC molecules of LC cell 120 may variously align themselves with a resulting electrostatic field. Such alignment may be relatively fast—e.g., within a time period of a few milliseconds. The so-called rise time trice to align LC molecules may be represented by the following equation:

$$t_{rise} \propto \frac{\gamma}{K_{ii}} d^2 \cdot \frac{1}{\left(\frac{U}{U_{th}}\right)^2 - 1}$$

where $\gamma$ is a rotational viscosity, $K_{ii}$ an elastic constant, d a height of the LC channel, U as the tuning voltage and $U_{th}$ as the material threshold voltage.

According to conventional techniques, an orientation of LC molecules similar to that of state 100b is achieved by switching off or otherwise decreasing a magnitude of an electrical field that otherwise provides for an orientation of LC molecules similar to that of state 100a. Typically, in order to transition LC molecules from orientations for an on/tuned state to orientations for an off/untuned state, conventional techniques and mechanisms merely switch off the electrostatic field that is previously applied to achieve an on/tuned state. Such conventional techniques and mechanisms rely only on the inherent relaxation characteristics of LC materials. The time required for LC molecules to relax from an on/tuned orientation to an off/untuned orientation is called decay time t decay, and is given by:

$$t_{decay} = \frac{\gamma \cdot d^2}{K_{ii} \pi^2}$$

where $\gamma$ is a rotational viscosity, $K_{ii}$ an elastic constant and d a height of the LC channel. Due to the relatively large height of the LC cell (typically 25 to 125 micrometers), the decay time is usually much longer than the rise time, typically in the range of several seconds in the case of high-birefringence LC's used for RF applications. For beam steering antennas, where a fast beam scanning is required, the long decay time is a serious problem.

Embodiments discussed herein variously provide techniques and/or mechanisms to efficiently operate a device that includes a plurality of electrodes and an LC channel—such as one disposed in a porous film or other interstitial material—disposed between at least two electrodes of the plurality of electrodes. The LC channel may be further disposed between panels (e.g., printed circuit boards, glass, flexible substrate material etc.) of the RF device, where such panels variously include or otherwise have disposed therein or thereon respective ones of the plurality of electrodes. Such an RF device may be, for example, a metamaterial surface antenna of a printed circuit assembly. Such panels may include, for example, boards such as printed circuit boards, glass, flexible substrates—such as one made of polyethylene naphthalate (PEN) for flexible display applications—or other suitable structures.

In contrast with such conventional techniques, certain embodiments are based on a realization that a different electrical field, having a non-zero magnitude and a different direction in the LC channel, may be applied to actively force ("drive") LC molecules each away from a y-axis orientation and toward an x-axis orientation. Consequently, a faster transition of the LC device to an off/untuned state may take place.

Figure 2:
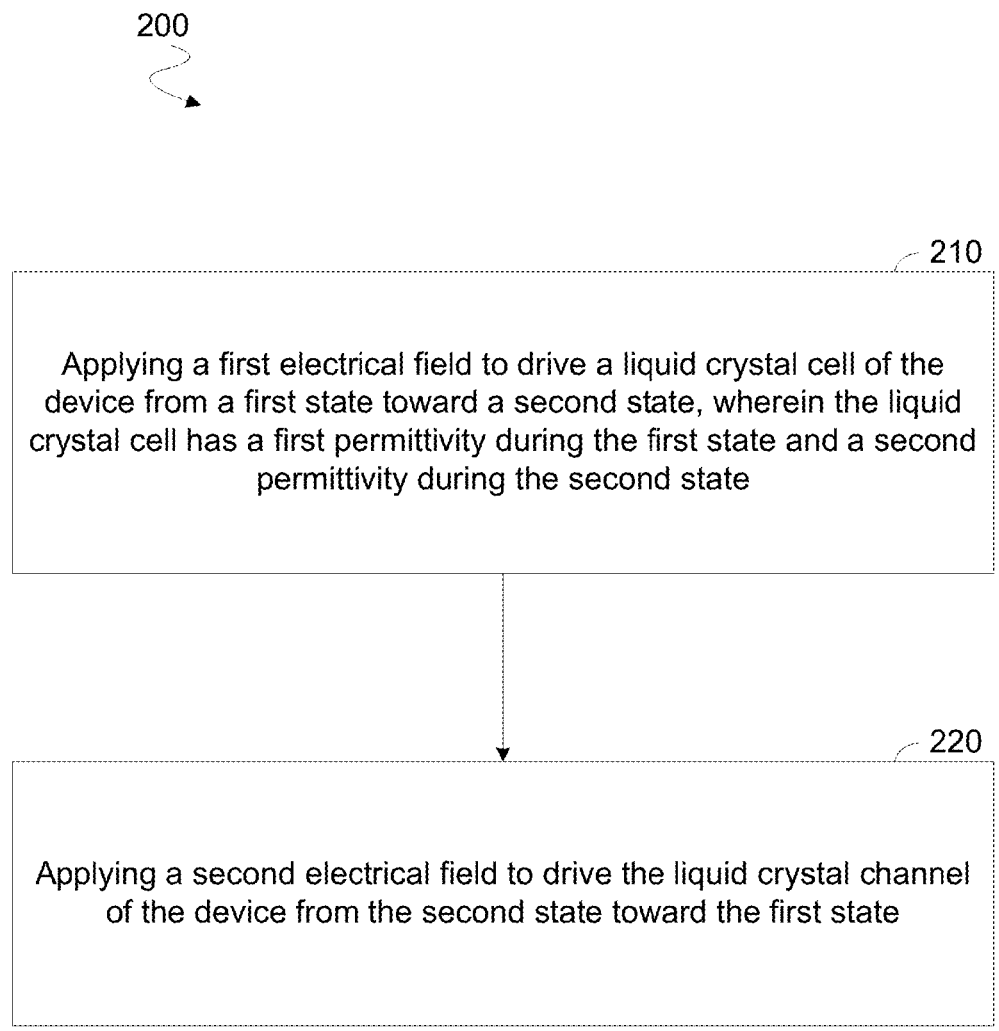
FIG. 2 is a flow diagram illustrating elements of a method for operating a liquid crystal device according to an embodiment.

FIG. 2 illustrates elements of a method 200 for operating a liquid crystal device according to an embodiment. Method 200 may operate a device having some or all features of the LC device illustrated in FIGS. 1A, 1B, for example. In one embodiment, method 200 includes operations to transition such an LC device toward one of states 100a, 100b.

Method 200 may include, at 210, applying a first electrical field to drive an LC cell of the device from a first state toward a second state, wherein the LC cell has a first permittivity during the first state and a second permittivity during the second state. For example, the first state and the second state may have different respective average directions of orientation for LC molecules of the LC cell. By way of illustration and not limitation, the applying operation at 210 may result in a transition of the device between states 100a, 100b. Although some embodiments are not limited in this regard, application of the first electrical field at 210 may be discontinued prior to the second state being achieved. For example, the first electrical field may be applied at least in part with a pair of electrodes, wherein the application of a component of the first electrical field with that electrode pair is changed or stopped while LC molecules continue their respective changes in orientation.

Method 200 may further comprise, at 220, applying a second electrical field to drive the LC cell of the device from the second state toward the first state. In one embodiment, the first state and the second state are, respectively, an ON state wherein a signal communication (or other) functionality is enabled, and an OFF state wherein the functionality is disabled. Alternatively or in addition, the first state and the second state may correspond to different respective tunings of an antenna, capacitance or other functionality of the device. At a given location in the LC cell, the first electrical field may have a first direction and a first non-zero magnitude. In such an embodiment, the second electrical field may have at the first location both a second direction (other than the first direction) and a second non-zero magnitude. For example, the first direction may, in different embodiments, be opposite, perpendicular to, or oblique to the second direction. In some embodiments, application of the second electrical field at 220 is discontinued prior to the first state being achieved.

The first electrical field may be applied at 210 with a first pair of electrodes of a plurality of electrodes of the device— e.g., where the second electrical field is applied at 220 with a second pair of electrodes (other than the first pair of electrodes) of the plurality of electrodes. In one embodiment, only one of the first pair of electrodes and the second pair of electrodes includes a first electrode of the plurality of electrodes. For example, the first pair of electrodes may include electrodes other than any electrode of the second electrode pair. Alternatively, one (e.g., only one) of the plurality of electrodes may be both an electrode of the first electrode pair and an electrode of the second electrode pair.

In some embodiments, the first pair of electrodes is the second pair of electrodes—e.g., where the first electrical field has a direction opposite to that of the second electrical field. For example, applying the first electrical field at 210 may include configuring a first mode of a circuit, the first mode comprising a first voltage level provided at a first electrode, and a second voltage level provided at a second electrode. In such an embodiment, applying the second electrical field at 220 may include configuring a second mode of the circuit, the second mode comprising a third voltage level provided at the first electrode and the second voltage level provided at the second electrode.

Method 200 may further comprise one or more operations (not shown) during one of the first state and the second state. Such operations may include, for example, radiating or guiding a RF electromagnetic wave with the liquid crystal cell. The communication unit may include an antenna, waveguide or other such mechanism that is tunable (e.g., providing variable capacitance) to perform such radiating or guiding.

Figure 3A:
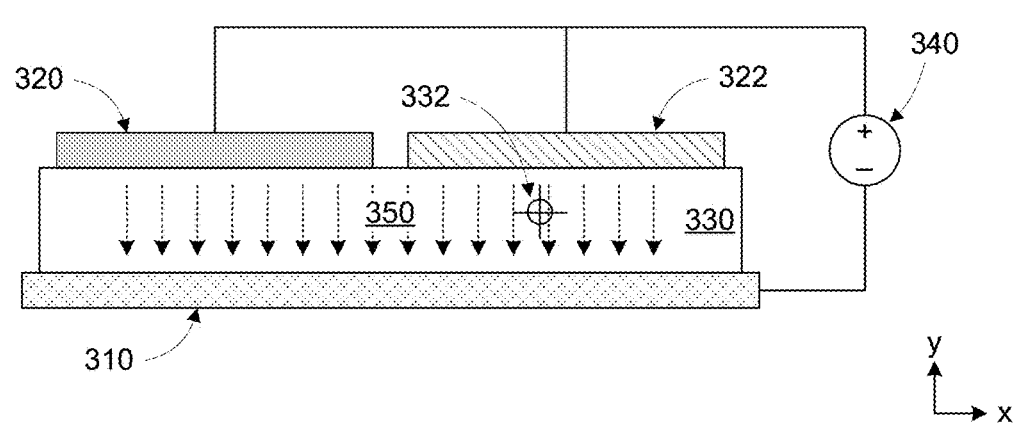
FIGS. 3A, 3B are cross-sectional diagrams each of a tunable liquid crystal device according to an embodiment.
Figure 3B:
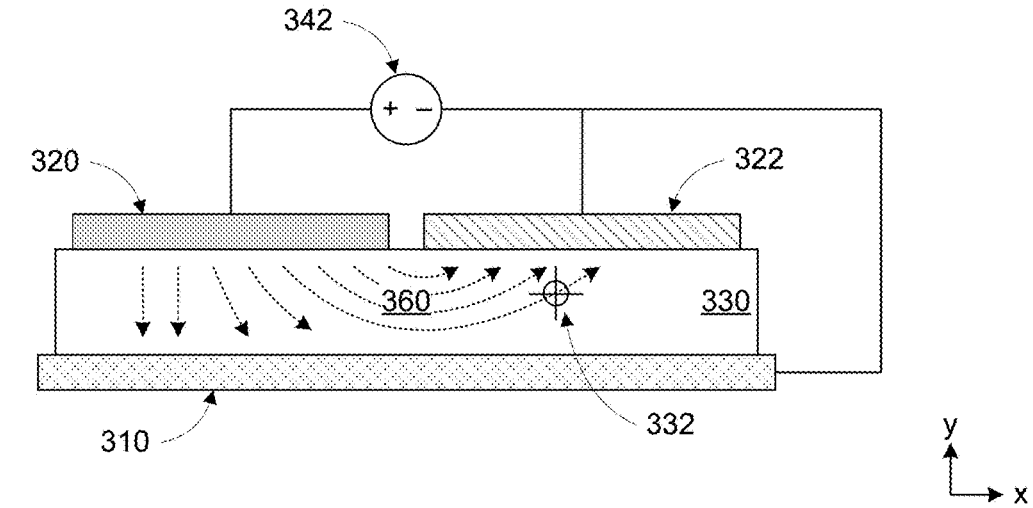

FIGS. 3A, 3B show, in cross-sectional views, respective states 300a, 300b of operation of a liquid crystal device (e.g., an antenna element) according to an embodiment. The device shown in FIGS. 3A, 3B may include some or all features of the device represented in FIGS. 1A, 1B, for example. In one embodiment, method 200 includes operations that transition a device between states 300a, 300b.

As shown in FIG. 3A, the liquid crystal device may include an LC cell 330 and multiple electrodes variously positioned, relative to LC cell 330 and relative to each other, to facilitate the generation of different electrical fields at different times. By way of illustration and not limitation, such multiple electrodes may include an electrode 310 located on one side of LC cell 330 and electrodes 320, 322 located on an opposite side of LC cell 330. The device may include more and/or differently positioned electrodes, in other embodiments.

In state 300a, a voltage source 340 is coupled to generate a first difference in potential between electrode 310 and one or both of electrodes 320, 322. Voltage source 340 may function as an alternating current (AC) source and/or as a direct current (DC) source. Based on the first difference in potential, a first electrical field 350 may be generated in LC cell 330. In an illustrative scenario according to one embodiment, field 350 is relatively more aligned along a y-axis direction—e.g., at least at some location 332 in LC cell 330—and is substantially orthogonal to a top side and/or to a bottom side of LC cell 330. As a result, polar LC molecules (not shown) of LC cell 330 may be relatively more oriented along the y-axis during state 300a—e.g., as compared to an average orientation of such LC molecules during state 300b. State 300a may function as an ON state of the device.

State 300b illustrates an application of one or more voltages to provide a relatively less tuned and/or OFF state of the device. In state 300b, a voltage source 342 is coupled to generate a second difference in potential between electrodes 320, 322. Electrode 310 may be at a potential of one of electrodes 320, 322 during state 300b, although certain embodiments are not limited in this regard. Based on the second potential difference, a second electrical field 360 is generated in LC cell 330. As compared to during state 300a, some portion of field 360 may be relatively less aligned along the y-axis direction—e.g., at location 332. As a result, the LC molecules of LC cell 330 may be relatively more oriented along the x-axis during state 300b.

The application of electrical field 360 with voltages source 342 may actively drive LC cell 330 toward a relatively less tuned state or an OFF state. An "un-tuning" electrical field 360, provided at least in part with a counter electrode, may not be entirely in the "horizontal" plane (parallel to the opposing surfaces of the electrodes). As a result, some LC molecules may not rotate back to a horizontal orientation completely. To address this, some embodiments further apply a back-switching voltage for a short time—e.g., as a pulse—and decrease the voltage magnitude thereafter. Such an approach may aid in LC molecules relaxing after the voltage is released.

Any of various conventional switching mechanisms and/or techniques may be adapted according to the features discussed herein, to transition between applying different electrical fields. By way of illustration and not limitation, a tunable resonator device may include or couple to voltage regulator logic (not shown) that is to selectively bypass or otherwise disable one of multiple voltage sources each to provide voltage to a respective one or more electrodes. Alternatively or in addition, such voltage regulator logic may include switching logic to variously transition between different switch modes each to couple a voltage source to a different respective combination of one or more electrodes.

Certain embodiments are variously directed to systems and/or methods to operate a tunable resonator device having some or all of the features discussed herein. In one embodiment, a system comprises controller logic (e.g., a microcontroller, application specific integrated circuit, and/or the like) included in or coupled to voltage regulator logic that is configurable to any of various modes for operation of the tunable resonator. Such control logic may detect a system state indicating a need to send and/or receive signals via the tunable resonator. In response, the control logic may signal the voltage regulator to provide particular voltages each to a respective electrode of the tunable resonator. Operation of such control logic and/or voltage regulator logic may include one or more operations adapted from any of a variety of conventional control/regulation techniques, which are not detailed herein to avoid obscuring features of certain embodiments.

To aid in discussing features of various embodiments, electrodes of a tunable resonator are discussed herein using the term "counter electrode" to refer to operation of an electrode that is to aid in driving an LC cell toward a relatively less tuned (e.g., OFF state). As used herein, an electrode is a counter electrode with respect to another electrode when the two electrodes are at different potentials to apply an electrical field—e.g., in an LC cell. For example, application of an electrical field with a first electrode and a second electrode that is to serve as a counter electrode with respect to that first electrode may result in LC molecules of the LC cell moving toward being relatively more horizontally oriented (along the cell's thickness) in parallel with the electrode surfaces. An electrode/counter electrode pair may aid in the application of an electrical field to transition the LC cell to a relatively more tuned state wherein, for example, LC molecules are oriented relatively more orthogonally to the electrode surfaces—i.e., more aligned across the cell's thickness. An electrode serving as a counter electrode to aid in driving an LC cell out of a tuning state may further serve (in a different mode of the resonator) as an electrode to aid in driving the LC cell into the tuned state. A ground plane or other reference electrode of an LC RF device may during some or all modes of the device, variously serve as a counter electrode with respect to one or more other electrodes of the device.

Figure 4:
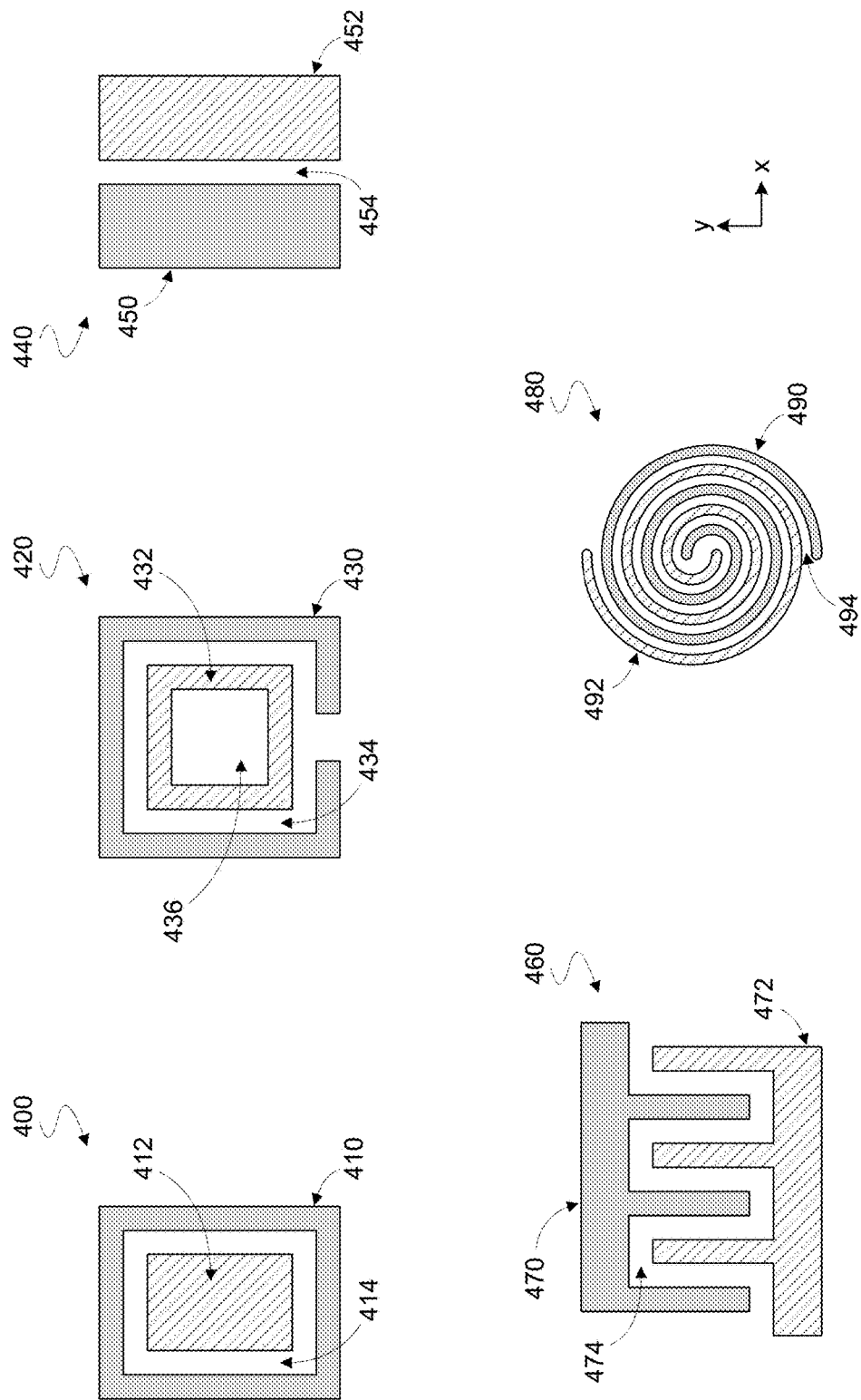
FIG. 4 shows profile views each of a respective arrangement of electrodes to operate a liquid crystal cell according to a corresponding embodiment.

FIG. 4 shows various configurations 400, 420, 440, 460, 480 of electrodes each including a respective first electrode and a respective second electrode that is to function as a counter electrode with respect to the first electrode. One or more of configurations 400, 420, 440, 460, 480 may each include, for example, features of electrodes 150, 160 or, in another embodiment, features of electrodes 320, 322. In an embodiment, method 200 includes applying an electrical field with one of configurations 400, 420, 440, 460, 480.

For any one of configurations 400, 420, 440, 460, 480, the two electrodes shown for that configuration may be disposed on one side of an LC cell (not shown) of a tunable device, and may operate with a third electrode (not shown) on an opposite side of the LC cell. The third electrode may include a reference (e.g., ground) electrode, for example. The third electrodes may be offset at the same distance from each of the two electrodes, or at different respective distances. Operation of the electrodes may include variously applying at least two different electrical fields (and corresponding potential differences) at different times, where—at a given location of the LC cell—the electrical fields each have a different respective direction.

The electrodes may comprise the same metallization that is used for the RF electrodes and/or of transparent and conductive materials such as Indium-Tin-oxide (ITO), aluminium zinc oxide (AZO), fluorine doped tin oxide (FTO) and zinc oxide (ZnO). Table 1 below provides examples of some values for dimensions and operating voltages for a tunable resonator device according to some embodiments. These values are given both for thin-film-transistor (TFT) technology and for printed circuit board (PCB) technology. However, the values and technologies represented in Table 1 are merely illustrative, and not limiting on certain embodiments.

TABLE 1

Example Parameters of an LC Device

|  | TFT technology | PCB technology |
|---|---|---|
| Electrode thickness | 100 nm-5 um | 1 um-17 um |
| Electrode width and separation | 1 um-100 um | 100 um-200 um |
| LC cell thickness | 2 um-25 um | 25 um-150 um |
| Voltage level in ON state | 20 V | +/−100 V |
| Voltage level in OFF state | 20 V | +/−100 V |

In each of the configurations 400, 420, 440, 460, 480 shown, the shading of the electrodes illustrates one example of respective voltage differences to be applied to generate an electrical field for driving an LC cell into an untuned/off state. The particular voltages to be applied to such electrodes, and the shape and the relative size of such electrodes are not limiting on certain embodiments, and may vary according to implementation-specific details.

A tunable resonator device according to an embodiment may include any of various types of patch antenna each with an electrode to serve as a counter electrode, with respect to another electrode of the patch antenna, as illustrated by configurations 400, 420. As shown in FIG. 4, configuration 400 may include electrodes 410, 412 separated by a gap 414, where electrode 410 forms a hole in which is disposed electrode 412. In another embodiment, configuration 420 includes electrodes 430, 432, where electrode 430 extends substantially around a periphery of electrode 432 to form a gap 434, and where electrode 432 forms a hole 436. By applying a voltage between the patch and the counter electrode—e.g., rather than merely decreasing a voltage difference between the patch and an underlying reference plane (not shown)—a horizontal tuning field can be established to actively drive back-switching.

In another embodiment, an antenna itself may consist of two (or more) electrodes allowing a tuning voltage to be applied between them. Configurations 440, 460, 480 variously illustrate examples of such antennas—e.g., where the respective electrodes structures shown are to operate with another electrode (not shown) of the tunable resonator that is on an opposite side of the LC cell. For example, configuration 440 may include electrodes 450, 452—each having a respective rectilinear profile—that are separated by a gap 454. In another embodiment, configuration 460 includes electrodes 470, 472 having respective comb structures that are interleaved with one another and separated by a gap 474. In still another embodiment, configuration 480 includes electrodes 490, 492 having respective spiral structures that are intertwined with one another and separated by a gap 494.

Configurations 400, 420, 440, 460, 480 each illustrate a respective embodiment wherein a pair of electrodes (or "electrode pair") includes one electrode that is to function as a counter electrode with respect to the other electrode of that same electrode pair—e.g., at least with respect to the driving of an LC cell toward a particular state. Such a state may be or contribute to an OFF mode of the communication unit and/or may be relatively untuned as compared to another mode of the LC cell. In another mode of the same communication unit (e.g., the mode including an ON state of the LC cell), the two electrodes of such an electrode pair may have the same voltage and/or may otherwise contribute each to the communication (e.g., propagation) of an RF electromagnetic wave. For example, in such a state, electrodes of an electrode pair may each radiate or guide a respective component the RF electromagnetic wave.

FIGS. 5A through 5E illustrate respective examples of electrical field radiation characteristics provided by embodiments such as those variously represented by configurations 400, 420, 440, 460, 480. One or more of the devices 500, 520, 540, 560, 580 variously shown in FIGS. 5A through 5E may each operate as a radiator based on the selective application of a tuning voltage. In some embodiments, electrodes of such a device may be coupled to further receive an untuning/detuning voltage to actively drive an LC cell toward a relatively less tuned state and/or an OFF state. The electrode structures represented in FIGS. 5A through 5E are each to operate over a respective LC cell and ground plane, which are not shown. In the illustrative electrical field radiation characteristics of FIGS. 5A through 5E, examples of current density gradient lines are shown in grey, and black gradation lines are used to various illustrate transitions of a farfield pattern from higher directivity to relatively low directivity.

Figure 5A:
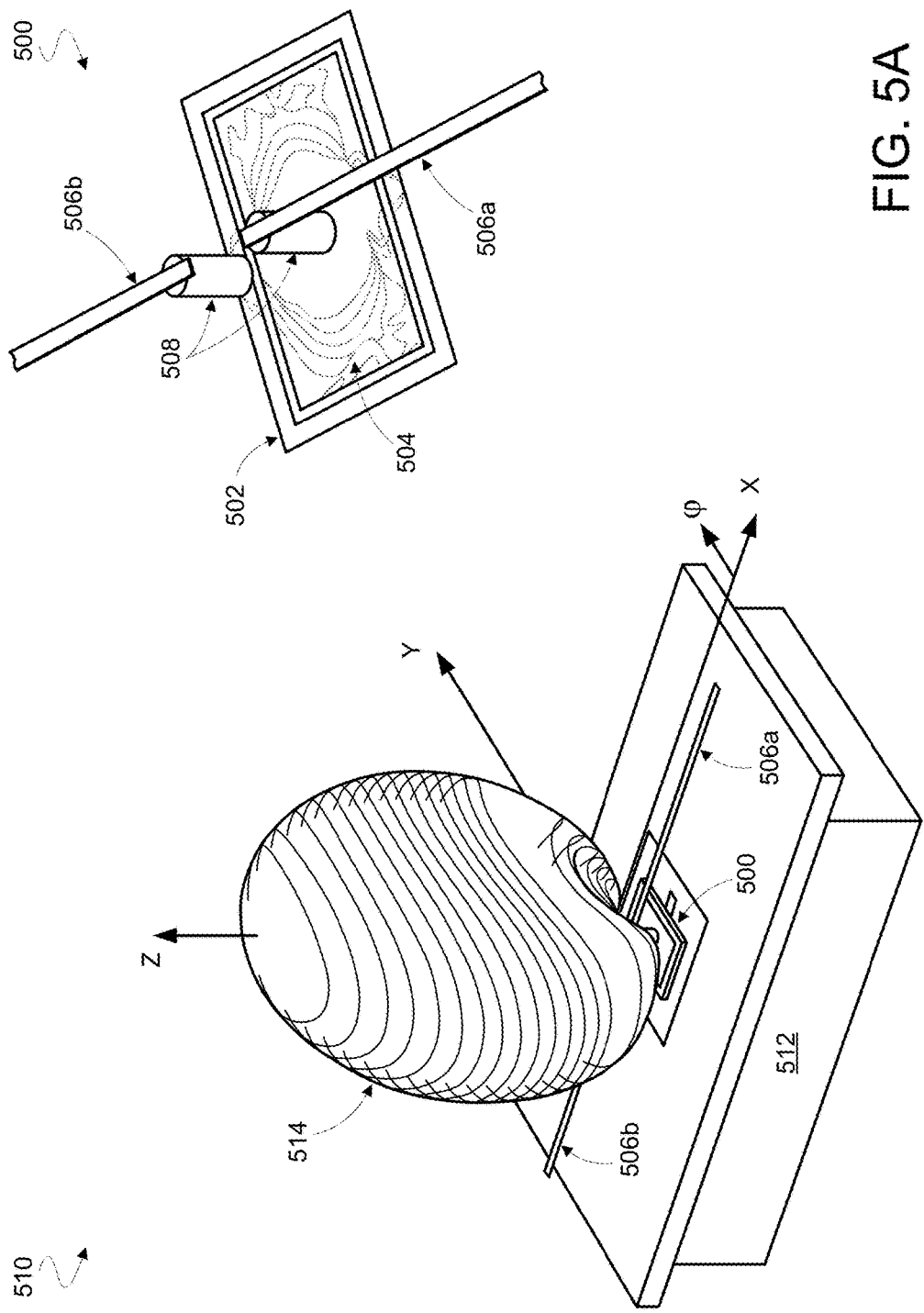
FIGS. 5A-5E show perspective views each of a respective liquid crystal device according to a corresponding embodiment.

FIG. 5A shows electrodes 502, 504 of an LC device 500 according to an embodiment. Electrodes 502, 504 may have some or all of the features of configuration 400, for example. In the illustrative embodiment shown, vias 508 couple electrodes 502, 504 each to a respective one of traces 506a, 506b. View 510 of FIG. 5A illustrates one example of a farfield pattern 514 that may be radiated, based on a signal received via on or both of traces 506a, 506b, during operation of device 500 while disposed in or on some base 512 (e.g., a printed circuit board or other substrate).

Figure 5B:
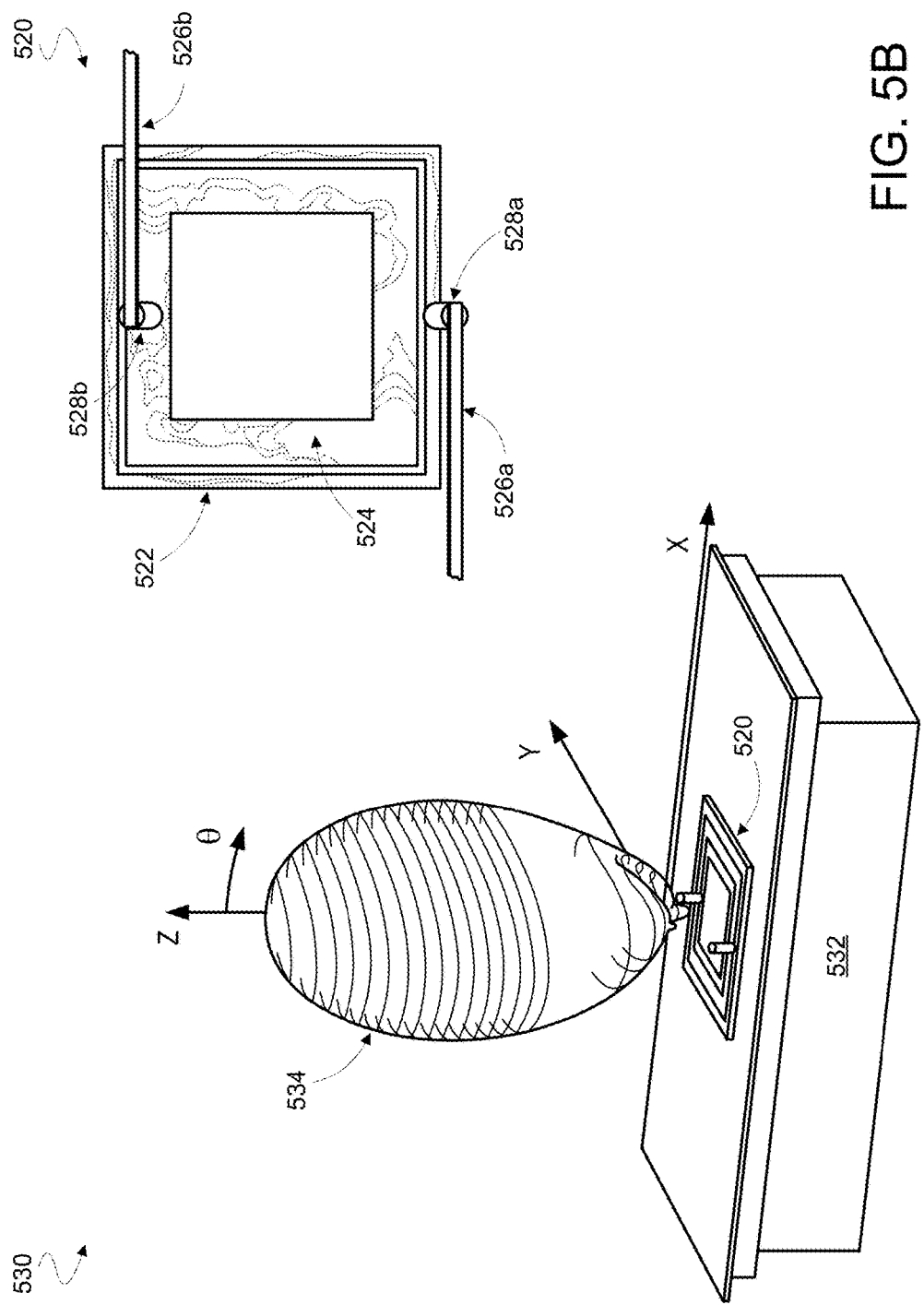
Figure 5C:
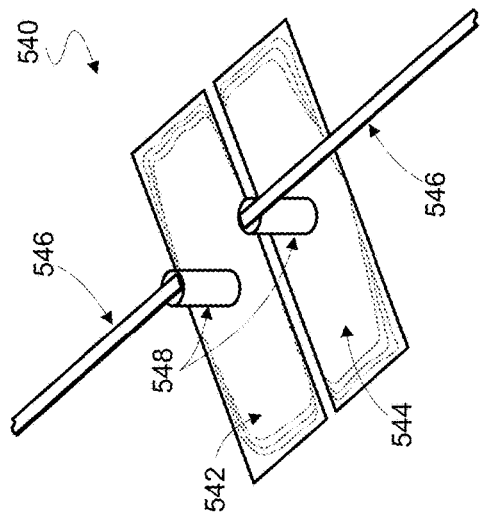
Figure 5C:
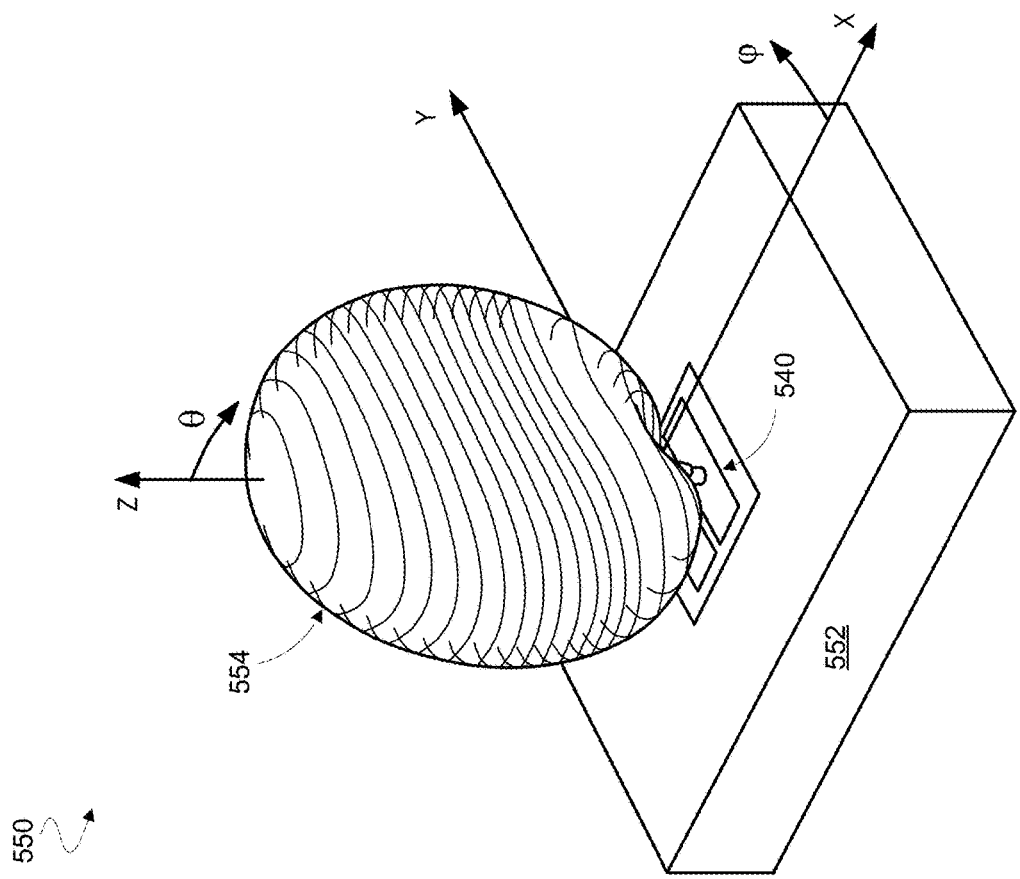

FIG. 5B shows electrodes 522, 524 of an LC device 520 according to another embodiment. Electrodes 522, 524 may have some or all of the features of configuration 420, for example. In the illustrative embodiment shown, vias 528a, 528b variously couple electrodes 522, 524 each to a respective one of traces 526a, 526b. View 530 of FIG. 5B illustrates one example of a farfield pattern 534 that may be radiated during operation of device 520 while disposed in or on a base 532. FIG. 5C shows electrodes 542, 544 of an LC device 540 according to another embodiment. Electrodes 542, 544 may have some or all of the features of configuration 440, for example. In the illustrative embodiment shown, vias 548 variously couple electrodes 542, 544 each to a respective one of traces 546. View 550 of FIG. 5C illustrates one example of a farfield pattern 554 that may be radiated during operation of device 540 while disposed in or on a base 552.

Figure 5D:
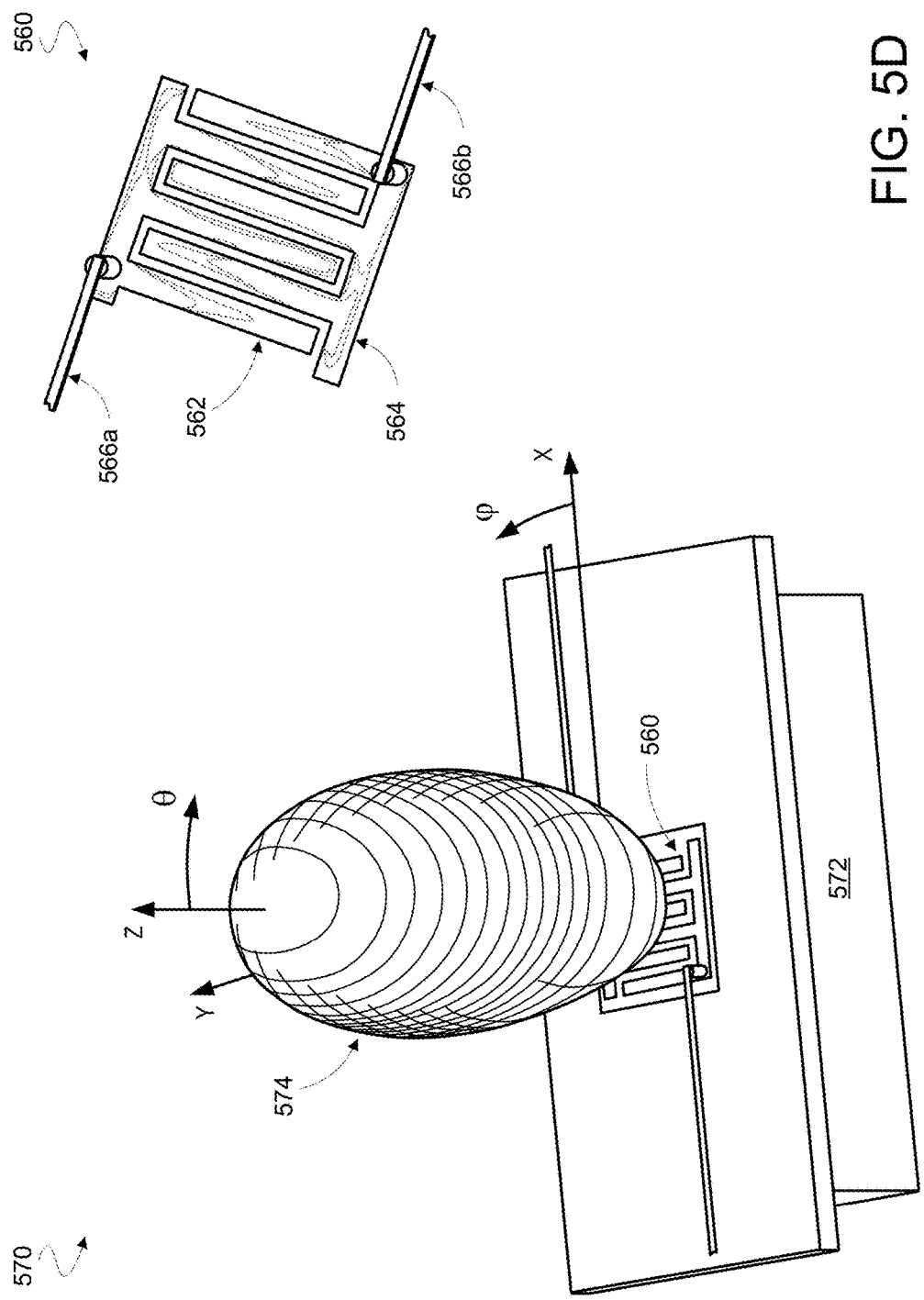
Figure 5E:
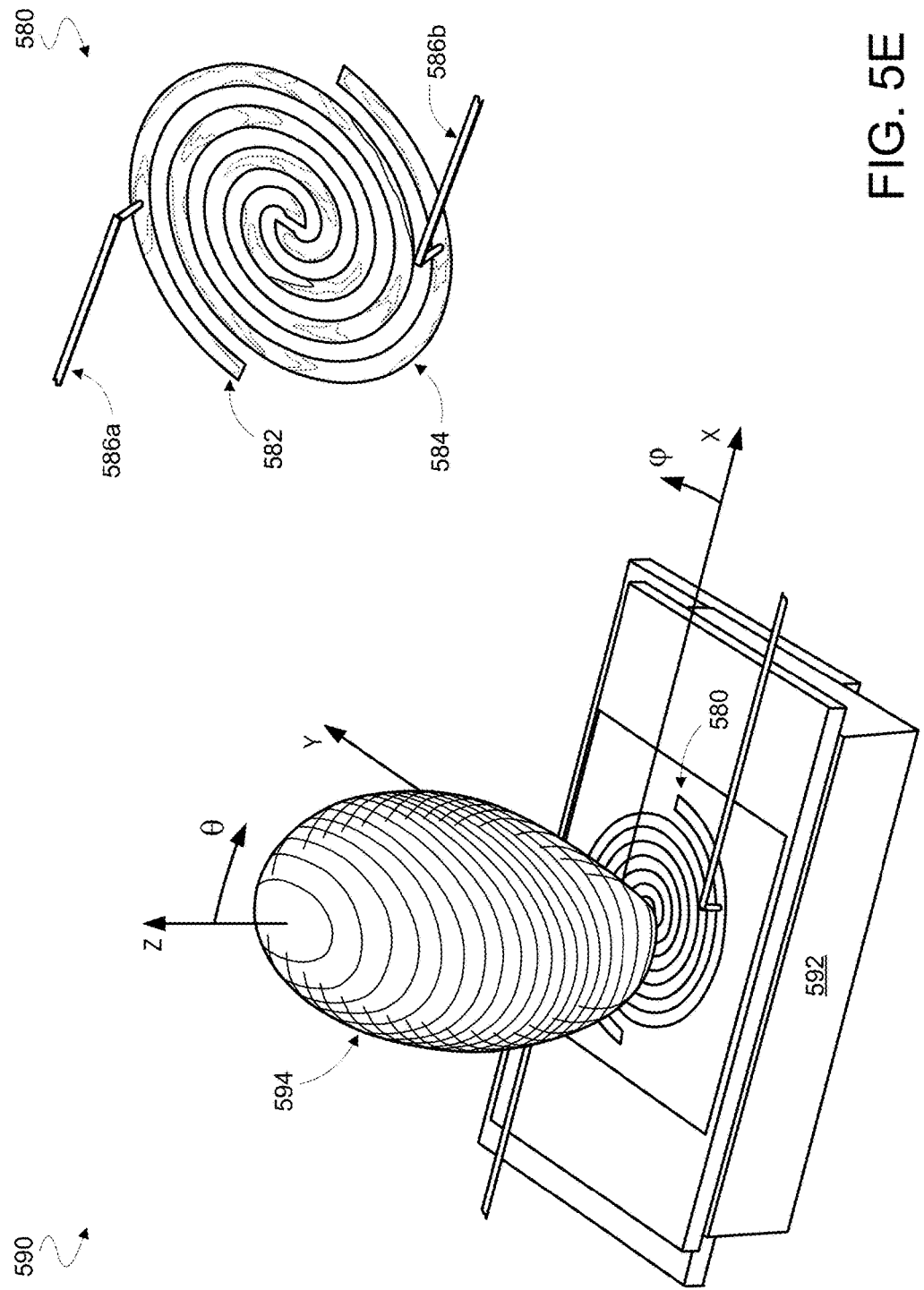

FIG. 5D shows electrodes 562, 564 of an LC device 560 according to another embodiment. Electrodes 562, 564 may have some or all of the features of configuration 460, for example. In the illustrative embodiment shown, electrodes 562, 564 are coupled to traces 566a, 566b, respectively. View 570 of FIG. 5D illustrates one example of a farfield pattern 574 that may be radiated during operation of device 560 while disposed in or on a base 572. FIG. 5E shows electrodes 582, 584 of an LC device 580 according to another embodiment. Electrodes 582, 584 may have some or all of the features of configuration 480, for example. In the illustrative embodiment shown, electrodes 582, 584 are coupled to traces 586a, 586b, respectively. View 590 of FIG. 5E illustrates one example of a farfield pattern 594 that may be radiated during operation of device 580 while disposed in or on a base 592.

Figure 6A:
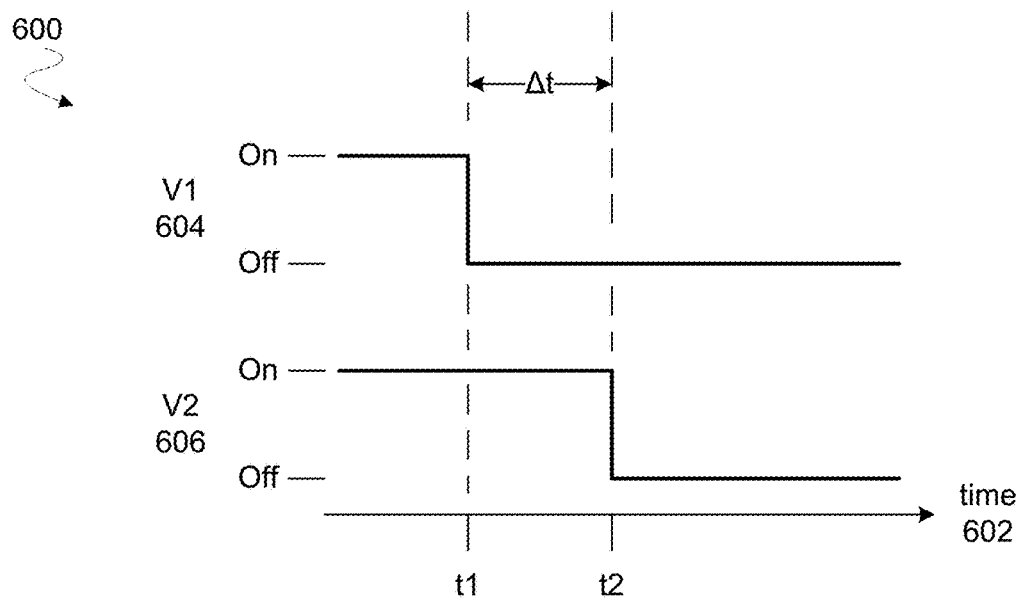
FIG. 6A is a timing diagram illustrating signaling to operate a liquid crystal device according to an embodiment.
Figure 6B:
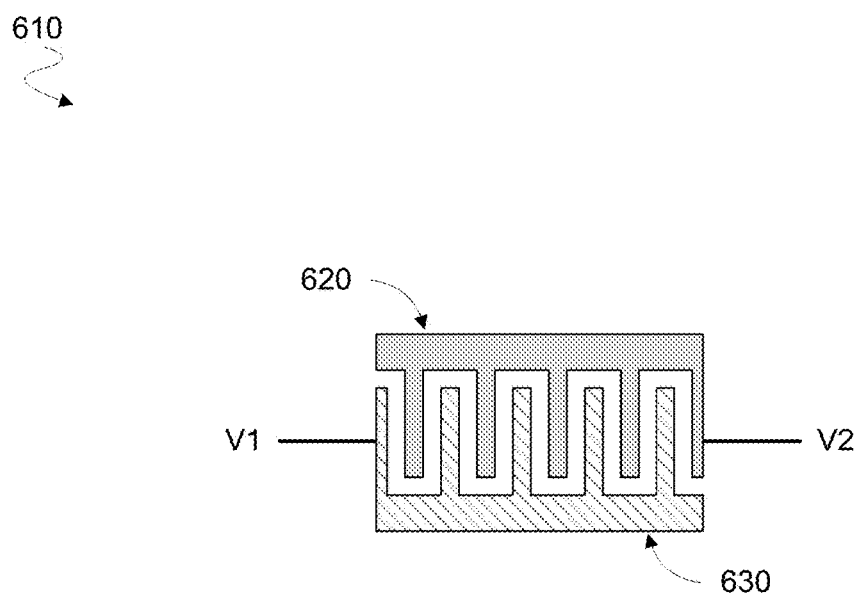
FIG. 6B is a profile view showing electrodes of a liquid crystal device to operate, according to an embodiment, based on signals illustrated in FIG. 6A.

FIG. 6A shows a timing diagram 600 illustrating one example of signaling to drive an LC device (e.g., a tunable resonator), according to an embodiment, from one tuning state toward another tuning state. More particularly, timing diagram 600 illustrates two voltage signals V1 604, V2 606, over time 602. In the illustrative embodiment of resonator 610 shown in FIG. 6B, signals V1 604, V2 606 may be provided each to a respective one of electrodes 620, 630 that, for example, have a configuration similar to that of electrodes 562, 564.

In timing diagram 600, an earlier-in-time transition of signal V1 604 at a time t1 may result in a period of a non-zero (or relatively larger in magnitude) difference between V1 604 and V2 606. In a time period Δt after time t1—e.g., until a later-in-time transition of V2 606 at time t2—a potential difference between the two electrodes may be established, resulting in a voltage between the two electrodes and an electrical field that is substantially horizontal in parallel with a midline plane of an LC cell (not shown). Accordingly, the electrode 630 receiving V1 604 may function as a counter electrode to the other electrode 620 during Δt. Such signaling may be considered a differential pulse—e.g., where the subsequent transition of V2 606 ends the period Δt of non-zero, or relatively larger in magnitude, difference between V1 604 and V2 606. The time period Δt of the differential pulse may be less than a total time needed to transition an LC cell to an OFF mode. For example, the transition of V1 604 at time t1 may initiate movement of LC molecules from respective orientations that implement an ON mode of the LC cell toward respective orientations that implement the OFF mode of the LC cell. However, the transition of V2 606 at time t2 may take place prior to such LC molecules completing their respective reorientations. In one embodiment, the time period Δt is variable (e.g., configurable by control circuitry coupled to the communication unit.

In an embodiment, different electrical fields may be applied to an LC cell at different times, where each electrical field is applied at least with a respective pair of electrodes (or "electrode pair") of a plurality of electrodes. Any of a wide variety of numbers and/or arrangements of—and control mechanisms for—such a plurality of electrodes may provide for selective application of electrical fields, according to different embodiments. For example, different pairs of electrodes—e.g., mutually exclusive pairs—may apply different respective electrical fields at different times. Alternatively or in addition, two (or more) electrodes may each be at a common voltage for the application of one electrical field, but at different voltages for the application of a different electrical field. In an embodiment, an electrical field may be applied by more than a pair of electrodes. Alternatively or in addition, different sets of electrodes may operate with different reference potentials, frequencies, voltage ranges and/or the like.

Figure 7:
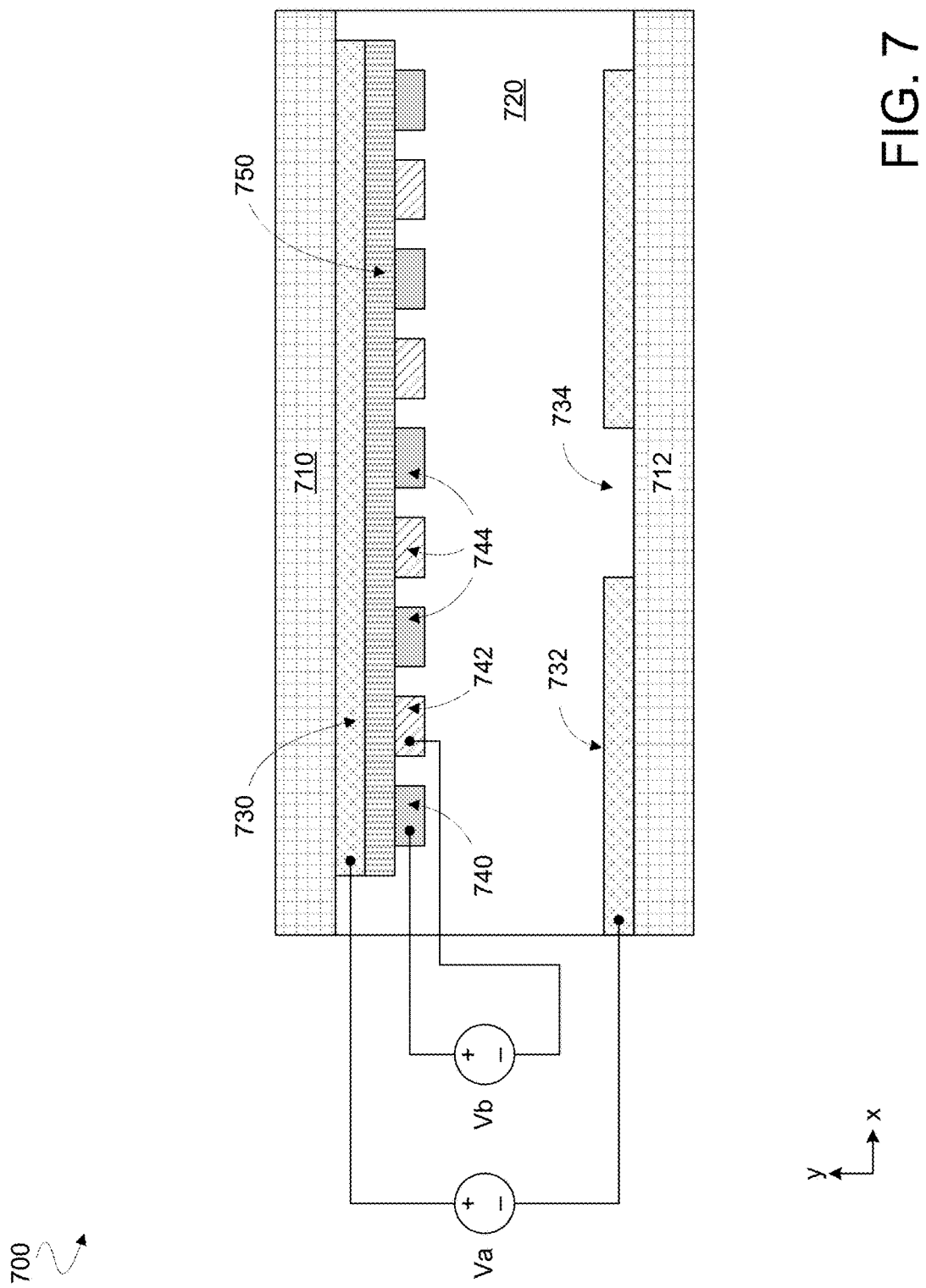
FIG. 7 is a cross-sectional diagram of a tunable liquid crystal device according to an embodiment.

An example of one counter electrode configuration according to an embodiment is illustrated by device 700 of FIG. 7. Device 700 may include features of any of various other LC devices herein—e.g., wherein operation of device 700 is according to method 200.

Device 700 may function as a patch antenna including an LC cell 720 disposed between a conductive iris layer 732 and a conductive patch 730—e.g., where iris layer 732 forms an iris structure 734 over which is disposed patch 730. Patch 730 and iris layer 732 may be coupled to one another via a voltage source Va that is to apply an electric field to move LC molecules toward alignment along a first dimension (e.g., in parallel with the y-axis shown) extending perpendicular to opposing sides of patch 730 and iris layer 732. Application of Va (e.g., either an AC voltage or a DC voltage) may include operations adapted from conventional antenna signal exchange techniques, which are not detailed herein. By contrast, additional interdigitated electrodes—e.g., including the illustrative electrodes 740, 742 and (optionally) one or more electrodes 744—may be located in or on the LC cell. The interdigitated electrodes may be separated from patch 730 by a non-conductive (e.g., dielectric) isolation layer 750. Some or all of the interdigitated electrodes may be variously coupled to one another via a voltage source Vb that is to apply another electric field to instead move LC molecules away from alignment along the first dimension—e.g., toward a second dimension perpendicular to the first dimension. By way of illustration and not limitation, Vb may be coupled to provide a potential difference at least between electrodes 740, 742, where such a potential difference actively drives LC molecules away from y-axis alignment and toward x-axis alignment. Accordingly, one or more potential differences each between a respective pair of interdigitated electrodes 740, 742, 744 may provide for faster back switching of the patch antenna of device 700.

Although the voltage sources Va, Vb are shown in FIG. 7 as being connected at respective points of the corresponding electrodes, the particular points of connection are merely illustrative, and not limiting on various embodiments. The same is true with respect to the points of connection variously illustrated on the electrodes represented in FIGS. 5A through 5E and 6. Also, although voltages Va and Vb are shown as being independent of one another and operating at respective voltages f1, f2, certain embodiments are not limited in these regards. Furthermore, although FIG. 7 shows nine interdigitated electrodes arranged in an alternating configuration, certain embodiments are not limited in this regard.

Device 700 illustrates an embodiment wherein, for implementing at least one mode of a communication unit (e.g., the mode including an OFF state of the LC cell), one electrode of an electrode pair is to function as a counter electrode with respect to the other electrode of that same electrode pair. In another mode of that same communication unit (e.g., the mode including an ON state of the LC cell), one or each of the electrode pair may be an electrode other than any electrode that participates in communication of an RF electromagnetic wave with the LC cell. In such a state, some or all of electrodes 740, 742, 744 may each be electrically decoupled from a source of the RF electromagnetic wave and/or may not be a cause of loss to the RF electromagnetic wave. For example, iris layer 732 and patch 730 may be respective electrodes that variously function to participate in radiating or guiding the RF electromagnetic wave (where some or all of electrodes 740, 742, 744 do not also participate in such radiating or guiding of the RF electromagnetic wave).

Figure 8:
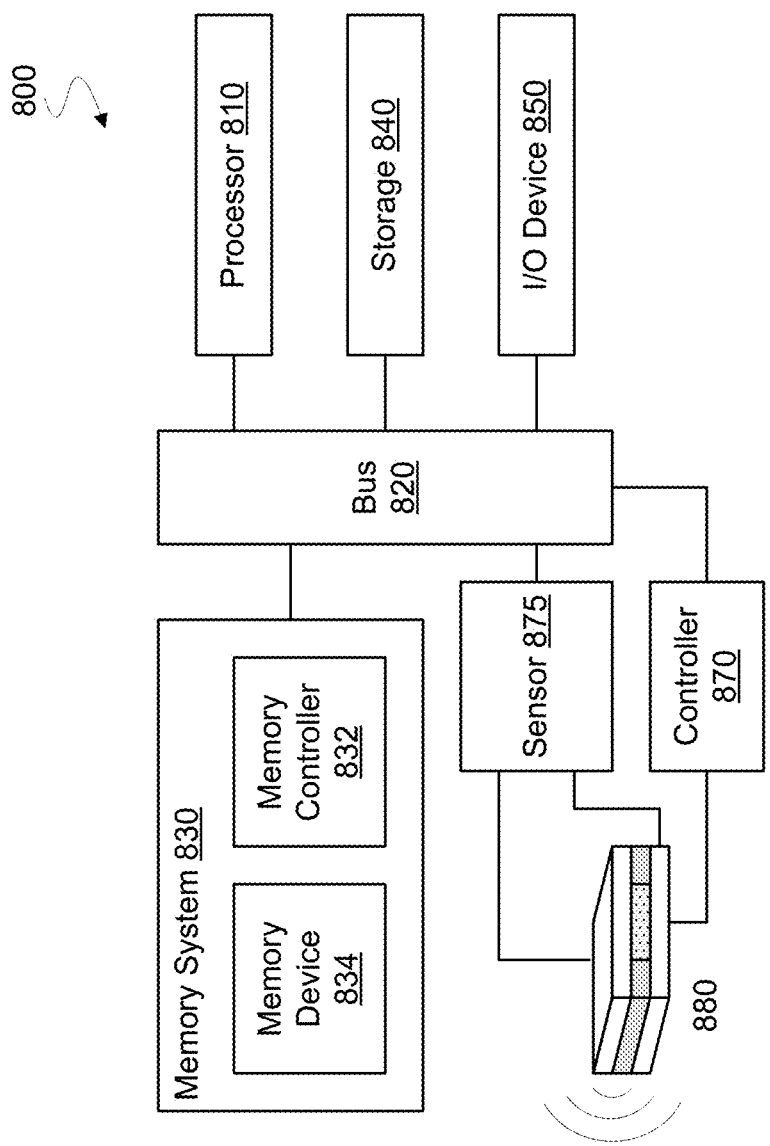
FIG. 8 is a high-level block diagram illustrating elements of a hardware platform according to an embodiment.

FIG. 8 illustrates elements of a platform 800 including a tunable resonator 880 according to an embodiment. Platform 800 may comprise a hardware platform of a desktop computer, laptop computer, handheld device (e.g., smart phone, palmtop computer, etc.) game console or other such system. Resonator 880 may include counter electrode structures having features variously discussed herein. A controller 870 of platform 800 may comprise circuitry coupled to apply various electric fields to an LC cell of resonator 880 at different times. A sensor 875 (e.g., a receiver/transmitter) may include circuitry to exchange signals via resonator 880—e.g., where the LC cell may be tuned in one or more respects by controller 870 for such a signal exchange. Operation of resonator 880 may include applying an electrical field, as variously described herein, to actively drive LC molecules (not shown) of resonator 880 toward an alignment that decreases a permittivity of the LC cell.

In an embodiment, resonator 880 serves as an antenna or other mechanism to facilitate communication on behalf of a host of platform 800. By way of illustration and not limitation, such a host may include one or more processors, such as the illustrative processor 810. One or more interconnects, as represented by the illustrative bus 820, may couple processor 810 to controller 870, sensor 875 and/or one or more components of platform 800.

In an embodiment, such one or more components may include a memory system 830 comprising a memory controller 832 and a memory device 834 (e.g., a dynamic random access memory). Memory device 834 may store instructions, data and/or other information that, for example, support execution of an operating system or other software by processor 810. A storage 840 of platform 800—e.g., including a hard disk drive and/or a solid state drive—may provide non-volatile storage of data to be made available to processor 810. In an embodiment, one or more input/output (I/O) devices 850—e.g., including a touchscreen, touchpad, keyboard, speaker, network interface and/or the like—may support exchanges to and/or from the platform 800 that are based on and/or determine signal exchanges via resonator 880.

Figure 9:
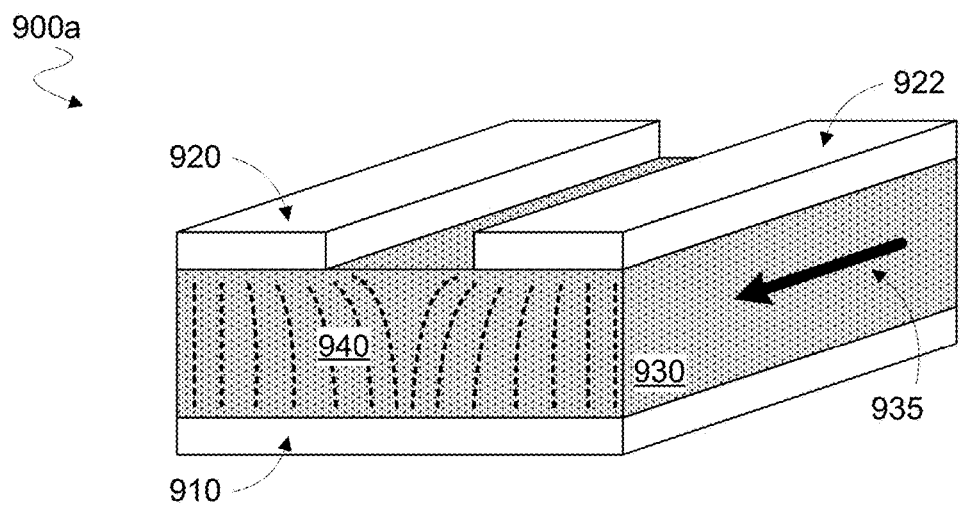
FIG. 9 shows perspective views of a tunable liquid crystal device according to an embodiment.
Figure 9:
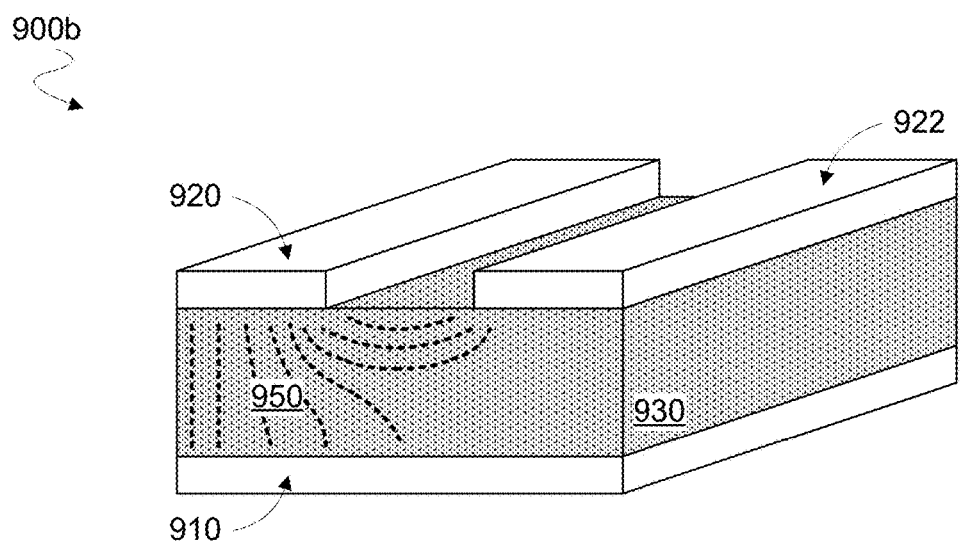

FIG. 9 shows, in cross-sectional views, respective states 900a, 900b of operation of a waveguide including a tunable liquid crystal device according to an embodiment. The waveguide shown in FIG. 9 may include some or all features of the device represented in FIGS. 1A, 1B or the device represented in FIGS. 3A, 3B, for example. In one embodiment, method 200 includes operations that transition a waveguide toward one of states 900a, 900b.

As shown in FIG. 9, a communication unit according to one embodiment may include a slot-line waveguide comprising an LC cell 930 and electrodes variously configured to generate different electrical fields at different times. By way of illustration and not limitation, such multiple electrodes may include an electrode 910 located on one side of LC cell 930 and electrodes 920, 922 located on an opposite side of LC cell 930. The device may include more and/or differently positioned electrodes, in other embodiments.

In state 900a, electrodes 920, 922 may be maintained each at a first potential that is different from a second potential at which electrode 910 is maintained. As a result, a first electrical field 940 may be generated in LC cell 930. Field 940 may be relatively more aligned along a z-axis direction and substantially orthogonal to a top side and/or to a bottom side of LC cell 930. As a result, polar LC molecules (not shown) of LC cell 930 may be relatively more oriented along the z-axis during state 900a—e.g., as compared to an average orientation of such LC molecules during state 900b. State 900a may function as an ON state of the waveguide to facilitate the guiding of an RF electromagnetic wave 935 by LC cell 930 (e.g., in the x-axis direction shown).

In state 900b, different respective voltages may be concurrently provided each to a respective one of electrodes 920, 922. Electrode 910 may be at a potential of one of electrodes 920, 922 during state 900b, although certain embodiments are not limited in this regard. As resulting second electrical field 950 in LC cell 930 may be relatively less aligned along the z-axis direction. Field 950 may initiate reorientation of LC molecules of LC cell 930 along the y-axis. The application of electrical field 950 may actively drive LC cell 930 toward a relatively less tuned state or an OFF state.

In one implementation, a device comprises a communication unit to radiate or to guide a RF electromagnetic wave, the communication unit including a plurality of electrodes, and a liquid crystal cell disposed between at least two electrodes of the plurality of electrodes. The device further comprises voltage control circuitry coupled to the communication unit, the voltage control circuitry to apply a first electrical field to drive the liquid crystal cell from a first state toward a second state, wherein the liquid crystal cell has a first permittivity during the first state and a second permittivity during the second state, the voltage control circuitry further to apply a second electrical field to drive the liquid crystal cell from the second state toward the first state. The first electrical field has a first direction and a first non-zero magnitude at a first location of the liquid crystal cell, and the second electrical field has a second direction and a second non-zero magnitude at the first location, the second direction other than the first direction.

In one embodiment, the plurality of electrodes includes a first electrode pair, wherein the voltage control circuitry to apply the first electrical field includes the voltage control circuitry to concurrently provide a first voltage to each electrode of the first electrode pair. In another embodiment, the voltage control circuitry to apply the second electrical field includes the voltage control circuitry to concurrently provide different voltages each to a respective electrode of the first electrode pair. In another embodiment, the communication unit to radiate or to guide the RF electromagnetic wave during the second state, wherein, during the second state, the electrodes of the first electrode pair are each to radiate or to guide a respective component of the RF electromagnetic wave.

In another embodiment, the plurality of electrodes includes a first electrode pair, wherein the voltage control circuitry to apply the second electrical field includes the voltage control circuitry to concurrently provide different voltages each to a respective electrode of the first electrode pair, wherein the communication unit to radiate or to guide the RF electromagnetic wave during the second state, wherein the first electrode pair includes an electrode other than any electrode that is to radiate or to guide a component of the RF electromagnetic wave. In another embodiment, each electrode of the first electrode pair is an electrode other than any electrode that is to radiate or to guide a component of the RF electromagnetic wave.

In another embodiment, the voltage control circuitry to apply the first electrical field with a first pair of electrodes of the plurality of electrodes. In another embodiment, the voltage control circuitry to apply the second electrical field with a second pair of electrodes of the plurality of electrodes. In another embodiment, only one of the first pair of electrodes and the second pair of electrodes includes a first electrode of the plurality of electrodes. In another embodiment, only one of the plurality of electrodes is both an electrode of the first electrode pair and an electrode of the second electrode pair. In another embodiment, all electrodes of first electrode pair are exclusive of any electrode of the second electrode pair.

In another embodiment, the first pair of electrodes is the second pair of electrodes. In another embodiment, the voltage control circuitry to apply the first electric field includes the voltage control circuitry to configure a first mode of voltage control circuitry, wherein the first mode includes a first voltage level provided at a first electrode, and a second voltage level provided at a second electrode. In such an embodiment, the voltage control circuitry to apply the second electrical field includes the voltage control circuitry to configure a second mode of voltage control circuitry, wherein the second mode includes a third voltage level provided at the first electrode, and the second voltage level provided at the second electrode. In another embodiment, the first direction is opposite the second direction. In another embodiment, the first direction is perpendicular to the second direction. In another embodiment, the first direction is oblique to the second direction.

In another implementation, a method of operating a communication device comprises applying a first electrical field to drive a liquid crystal cell of the communication device from a first state toward a second state, wherein the liquid crystal cell has a first permittivity during the first state and a second permittivity during the second state. The method further comprises applying a second electrical field to drive the liquid crystal cell of the communication device from the second state toward the first state, wherein the first electrical field has a first direction and a first non-zero magnitude at a first location of the liquid crystal cell, and wherein the second electrical field has a second direction and a first non-zero magnitude at the first location, the second direction other than the first direction, and during one of the first state and the second state, radiating or guiding a radio frequency electromagnetic wave with the liquid crystal cell.

In one embodiment, the plurality of electrodes includes a first electrode pair, wherein applying the first electrical field includes concurrently providing a first voltage to each electrode of the first electrode pair. In another embodiment, applying the second electrical field includes concurrently providing different voltages each to a respective electrode of the first electrode pair. In another embodiment, the RF electromagnetic wave is radiated or guided with the liquid crystal cell during the second state, wherein, during the second state, the electrodes of the first electrode pair each radiate or guide a respective component of the RF electromagnetic wave.

In another embodiment, the plurality of electrodes includes a first electrode pair, wherein applying the second electrical field includes concurrently providing different voltages each to a respective electrode of the first electrode pair, wherein the RF electromagnetic wave is radiated or guided with the liquid crystal cell during the second state, wherein the first electrode pair includes an electrode other than any electrode that is to radiate or to guide a component of the RF electromagnetic wave. In another embodiment, each electrode of the first electrode pair is an electrode other than any electrode that is to radiate or to guide a component of the RF electromagnetic wave.

In another embodiment, the communication device includes a plurality of electrodes, and wherein the first electrical field is applied with a first pair of electrodes of the plurality of electrodes. In another embodiment, the second electrical field is applied with a second pair of electrodes of the plurality of electrodes. In another embodiment, only one of the first pair of electrodes and the second pair of electrodes includes a first electrode of the plurality of electrodes. In another embodiment, only one of the plurality of electrodes is both an electrode of the first electrode pair and an electrode of the second electrode pair. In another embodiment, all electrodes of first electrode pair are exclusive of any electrode of the second electrode pair.

In another implementation, a non-transitory computer-readable storage medium has stored thereon instructions which, when executed by one or more processing units, cause the one or more processing units to perform a method at a communication device. In an embodiment, the method comprises applying a first electrical field to drive a liquid crystal cell of the communication device from a first state toward a second state, wherein the liquid crystal cell has a first permittivity during the first state and a second permittivity during the second state. In such an embodiment, the method further comprises applying a second electrical field to drive the liquid crystal cell from the second state toward the first state, wherein the first electrical field has a first direction and a first non-zero magnitude at a first location of the liquid crystal cell, and wherein the second electrical field has a second direction and a first non-zero magnitude at the first location, the second direction other than the first direction, wherein, during one of the first state and the second state, a radio frequency electromagnetic wave is radiated or guided with the liquid crystal cell. In one embodiment, the first electrical field is applied with a first pair of electrodes of a plurality of electrodes of the communication device, and wherein the second electrical field is applied with a second pair of electrodes of a plurality of electrodes, wherein only one of the first pair of electrodes and the second pair of electrodes includes a first electrode of the plurality of electrodes.

In another implementation, a system comprises a tunable resonator to radiate or to guide a radio frequency (RF) electromagnetic wave, the tunable resonator including a plurality of electrodes, and a liquid crystal cell disposed between at least two electrodes of the plurality of electrodes. The system further comprises voltage control circuitry coupled to the tunable resonator, the voltage control circuitry to apply a first electrical field to drive the liquid crystal cell from a first state toward a second state, wherein the liquid crystal cell has a first permittivity during the first state and a second permittivity during the second state, the voltage control circuitry further to apply a second electrical field to drive the liquid crystal cell of the tunable resonator from the second state toward the first state, wherein the first electrical field has a first direction and a first non-zero magnitude at a first location of the liquid crystal cell, and wherein the second electrical field has a second direction and a second non-zero magnitude at the first location, the second direction other than the first direction. The system further comprises a display coupled to the tunable resonator, the display to generate an image based on a signal exchanged via the tunable resonator.

In another embodiment, the voltage control circuitry is to apply the first electrical field with a first pair of electrodes of the plurality of electrodes. In another embodiment, the voltage control circuitry is to apply the second electrical field with a second pair of electrodes of the plurality of electrodes. In another embodiment, only one of the first pair of electrodes and the second pair of electrodes includes a first electrode of the plurality of electrodes. In another embodiment, only one of the plurality of electrodes is both an electrode of the first electrode pair and an electrode of the second electrode pair.

Techniques and architectures for changing a permittivity of a liquid crystal cell are described herein. In the above description, for purposes of explanation, numerous specific details are set forth in order to provide a thorough understanding of certain embodiments. It will be apparent, however, to one skilled in the art, that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A device comprising:
   a communication unit to radiate or to guide a radio frequency (RF) electromagnetic wave, the communication unit including:
      a plurality of electrodes, wherein the plurality of electrodes includes a first electrode pair; and
      a liquid crystal cell disposed between at least two electrodes of the plurality of electrodes; and
   voltage control circuitry coupled to the communication unit, the voltage control circuitry to apply a first electrical field to drive the liquid crystal cell from a first state toward a second state, wherein the liquid crystal cell has a first permittivity during the first state and a second permittivity during the second state, the voltage control circuitry further to apply a second electrical field to drive the liquid crystal cell from the second state toward the first state, wherein the first electrical field has a first direction and a first non-zero magnitude at a first location of the liquid crystal cell, and wherein the second electrical field has a second direction and a second non-zero magnitude at the first location, the second direction other than the first direction,
wherein the communication unit to radiate or to guide the RF electromagnetic wave during the second state, wherein, during the second state, the electrodes of the first electrode pair each radiate or guide a respective component of the RF electromagnetic wave.

2. The device of claim 1, wherein the voltage control circuitry to apply the first electric field includes the voltage control circuitry to configure a first mode including:
   a first voltage level provided at a first electrode of the plurality of electrodes; and
   a second voltage level provided at a second electrode of the plurality of electrodes;
   wherein the voltage control circuitry to apply the second electrical field includes the voltage control circuitry to configure a second mode including:
   a third voltage level provided at the first electrode; and
   the second voltage level provided at the second electrode.

3. The device of claim 1, wherein the voltage control circuitry to apply the second electrical field includes the voltage control circuitry to concurrently provide different voltages each to a respective electrode of the first electrode pair.

4. The device of claim 1, wherein the first direction is perpendicular to the second direction.

5. A device comprising:
   a communication unit to radiate or to guide a radio frequency (RF) electromagnetic wave, the communication unit including:
      a plurality of electrodes, wherein the plurality of electrodes includes a first electrode pair; and
      a liquid crystal cell disposed between at least two electrodes of the plurality of electrodes; and
   voltage control circuitry coupled to the communication unit, the voltage control circuitry to apply a first electrical field to drive the liquid crystal cell from a first state toward a second state, wherein the liquid crystal cell has a first permittivity during the first state and a second permittivity during the second state, the voltage control circuitry further to apply a second electrical field to drive the liquid crystal cell from the second state toward the first state, wherein the first electrical field has a first direction and a first non-zero magnitude at a first location of the liquid crystal cell, and wherein the second electrical field has a second direction and a second non-zero magnitude at the first location, the second direction other than the first direction,
      wherein the voltage control circuitry to apply the second electrical field includes the voltage control circuitry to concurrently provide different voltages each to a respective electrode of the first electrode pair, wherein the communication unit to radiate or to guide the RF electromagnetic wave during the second state, wherein the first electrode pair includes an electrode other than any electrode that is to radiate or to guide a component of the RF electromagnetic wave.

6. The device of claim 5, wherein each electrode of the first electrode pair is an electrode other than any electrode that is to radiate or to guide a component of the RF electromagnetic wave.

7. A device comprising:
   a communication unit to radiate or to guide a radio frequency (RF) electromagnetic wave, the communication unit including:
      a plurality of electrodes; and
      a liquid crystal cell disposed between at least two electrodes of the plurality of electrodes; and
   voltage control circuitry coupled to the communication unit, the voltage control circuitry to apply a first electrical field to drive the liquid crystal cell from a first state toward a second state, wherein the liquid crystal cell has a first permittivity during the first state and a second permittivity during the second state, the voltage control circuitry further to apply a second electrical field to drive the liquid crystal cell from the second state toward the first state, wherein the first electrical field has a first direction and a first non-zero magnitude at a first location of the liquid crystal cell, and wherein the second electrical field has a second direction and a second non-zero magnitude at the first location, the second direction other than the first direction, wherein the first direction is opposite the second direction.

8. A method of operating a communication device having a plurality of electrodes that includes a first electrode pair, the method comprising:
   applying a first electrical field to drive a liquid crystal cell of the communication device from a first state toward a second state, wherein the liquid crystal cell has a first permittivity during the first state and a second permittivity during the second state, wherein applying the first electrical field includes concurrently providing a first voltage to each electrode of the first electrode pair;
   applying a second electrical field to drive the liquid crystal cell of the communication device from the second state toward the first state, wherein the first electrical field has a first direction and a first non-zero magnitude at a first location of the liquid crystal cell, and wherein the second electrical field has a second direction and a first non-zero magnitude at the first location, the second direction other than the first direction; and
   during one of the first state and the second state, radiating or guiding a radio frequency electromagnetic wave with the liquid crystal cell, wherein the RF electromagnetic wave is radiated or guided with the liquid crystal cell during the second state, and wherein, during the second state, the electrodes of the first electrode pair each radiate or guide a respective component of the RF electromagnetic wave.

9. The method of claim 8, wherein applying the second electrical field includes concurrently providing different voltages each to a respective electrode of the first electrode pair.

10. A method of operating a communication device having a plurality of electrodes that includes a first electrode pair, the method comprising:
   applying a first electrical field to drive a liquid crystal cell of the communication device from a first state toward a second state, wherein the liquid crystal cell has a first permittivity during the first state and a second permittivity during the second state, wherein applying the second electrical field includes concurrently providing different voltages each to a respective electrode of the first electrode pair;
   applying a second electrical field to drive the liquid crystal cell of the communication device from the second state toward the first state, wherein the first electrical field has a first direction and a first non-zero magnitude at a first location of the liquid crystal cell, and wherein the second electrical field has a second direction and a first non-zero magnitude at the first location, the second direction other than the first direction; and during one of the first state and the second state, radiating or guiding a radio frequency electromagnetic wave with the liquid crystal cell, wherein the RF electromagnetic wave is radiated or guided with the liquid crystal cell during the second state, wherein the first electrode pair includes an electrode other than any electrode that is to radiate or to guide a component of the RF electromagnetic wave.

11. The method of claim 10, wherein each electrode of the first electrode pair is an electrode other than any electrode that is to radiate or to guide a component of the RF electromagnetic wave.

12. A non-transitory computer-readable storage medium having stored thereon instructions which, when executed by one or more processing units, cause the one or more processing units to perform a method at a communication device having a plurality of electrodes that includes a first electrode pair, the method comprising:

applying a first electrical field to drive a liquid crystal cell of the communication device from a first state toward a second state, wherein the liquid crystal cell has a first permittivity during the first state and a second permittivity during the second state, wherein applying the first electrical field includes concurrently providing a first voltage to each electrode of the first electrode pair; and applying a second electrical field to drive the liquid crystal cell from the second state toward the first state, wherein the first electrical field has a first direction and a first non-zero magnitude at a first location of the liquid crystal cell, and wherein the second electrical field has a second direction and a first non-zero magnitude at the first location, the second direction other than the first direction;

wherein, during one of the first state and the second state, a radio frequency electromagnetic wave is radiated or guided with the liquid crystal cell, wherein the RF electromagnetic wave is radiated or guided with the liquid crystal cell during the second state, and wherein, during the second state, the electrodes of the first electrode pair each radiate or guide a respective component of the RF electromagnetic wave.

13. The computer-readable storage medium of claim 12, wherein the first electrical field is applied with a first pair of electrodes of a plurality of electrodes of the communication device, and wherein the second electrical field is applied with a second pair of electrodes of a plurality of electrodes, wherein only one of the first pair of electrodes and the second pair of electrodes includes a first electrode of the plurality of electrodes.

14. A system comprising:

a tunable resonator to radiate or to guide a radio frequency (RF) electromagnetic wave, the tunable resonator including:

a plurality of electrodes; and a liquid crystal cell disposed between at least two electrodes of the plurality of electrodes;

voltage control circuitry coupled to the tunable resonator, the voltage control circuitry to apply a first electrical field to drive the liquid crystal cell from a first state toward a second state, wherein the liquid crystal cell has a first permittivity during the first state and a second permittivity during the second state, the voltage control circuitry further to apply a second electrical field to drive the liquid crystal cell of the tunable resonator from the second state toward the first state, wherein the first electrical field has a first direction and a first non-zero magnitude at a first location of the liquid crystal cell, and wherein the second electrical field has a second direction and a second non-zero magnitude at the first location, the second direction other than the first direction; and a display coupled to the tunable resonator, the display to generate an image based on a signal exchanged via the tunable resonator.

15. The system of claim 14, the voltage control circuitry to apply the first electrical field with a first pair of electrodes of the plurality of electrodes, and the voltage control circuitry to apply the second electrical field with a second pair of electrodes of the plurality of electrodes, wherein only one of the first pair of electrodes and the second pair of electrodes includes a first electrode of the plurality of electrodes.

16. The system of claim 15, wherein one of the plurality of electrodes is both an electrode of the first electrode pair and an electrode of the second electrode pair.

* * * * *